United States Patent
Hayashi et al.

(10) Patent No.: US 7,575,786 B2
(45) Date of Patent: Aug. 18, 2009

(54) PROCESS FOR PRODUCING OPTICAL ELEMENT

(75) Inventors: Shinji Hayashi, Tokyo-To (JP); Tomoya Kawashima, Tokyo-To (JP); Norihisa Moriya, Tokyo-To (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 431 days.

(21) Appl. No.: 11/390,990

(22) Filed: Mar. 28, 2006

(65) Prior Publication Data

US 2006/0222783 A1   Oct. 5, 2006

(30) Foreign Application Priority Data

Mar. 29, 2005   (JP) .............................. 2005-094579

(51) Int. Cl.
   *C09K 19/00*   (2006.01)
   *C09K 19/06*   (2006.01)
   *C09K 19/52*   (2006.01)

(52) U.S. Cl. .................... 428/1.1; 428/1.3; 252/299.01; 252/299.5; 430/20; 349/117

(58) Field of Classification Search ............ 252/299.01, 252/299.5; 428/1.1, 1.3; 430/20; 349/117
   See application file for complete search history.

(56) References Cited

U.S. PATENT DOCUMENTS

| 7,411,645 B2 * | 8/2008 | Kashima ..................... 349/129 |
| 2004/0189909 A1 * | 9/2004 | Kashima ..................... 349/117 |

* cited by examiner

*Primary Examiner*—Geraldina Visconti
(74) *Attorney, Agent, or Firm*—Burr & Brown

(57) ABSTRACT

A process for producing an optical element having a patterned quarter-wave retardation for use in a semitransmission reflection liquid crystal display device is provided. The process includes the steps of coating a coating liquid including a polymerizable liquid crystal onto a base material to form a coating film, aligning the polymerizable liquid crystal to a liquid crystal phase state, applying an ionizing radiation to the coating film through a photomask to polymerize the polymerizable liquid crystal in the liquid crystal phase state, whereby the polymerizable liquid crystal only in its exposed part is cured to form the liquid crystal layer, and heating the resultant substrate with the coating film formed thereon to bring the polymerizable liquid crystal in the uncured state to an isotropic phase state and, in this state, to polymerize the uncured polymerizable liquid crystal to form an isotropic layer.

8 Claims, 2 Drawing Sheets

PROCESS FOR PRODUCING OPTICAL ELEMENT

FIELD OF THE INVENTION

The present invention relates to a process for producing an optical element, which can convert linearly polarized light to circularly polarized light, an optical element produced by said process, and a semitransmission-type liquid crystal display device comprising said optical element.

BACKGROUND OF THE INVENTION

In recent years, the realization of a size reduction in liquid crystal display devices has led to widespread use of liquid crystal display devices, for example, in portable telephones (cellular phones) and PDAs. In the small-size liquid crystal display devices, in addition to power saving, an increase in luminance and an increase in contrast are an important task to be attained. To attain the above task, reflection-type or semitransmission-type liquid crystal display devices for power saving and optical elements for improving the luminance and contrast for these liquid crystal display devices have been developed.

A liquid crystal display device, in which a reflection film, formed of a metal film of aluminum or the like-having openings through which light can be transmitted, functions as a light semitransmission film, has been proposed as one form of the semitransmission-type liquid crystal display device. In this semitransmission-type liquid crystal display device, a liquid crystal layer, which causes a quarter-wave phase shift in a non-voltage-applied state, is held between a pair of glass substrates. A semitransmission reflection layer and a transparent electrode formed of a transparent electrically conductive film of indium tin oxide (hereinafter abbreviated to "ITO") or the like are stacked on the inner face of the lower (backlight side) glass substrate, and an aligning film is provided so as to cover this transparent electrode. On the other hand, a transparent electrode formed of a transparent electrically conductive film of ITO or the like is formed on the inner face of the upper (display face side) glass substrate, and an aligning film is provided so as to cover this transparent electrode. A quarter-wave plate and a polarizing plate are disposed in that order from the substrate side on the outer face side of the upper glass substrate. On the other hand, a quarter-wave plate and a polarizing plate are provided in that order from the substrate side on the outer face side of the lower glass substrate. The quarter-wave plate is an optical element that, in a certain wavelength region, can convert linearly polarized light to substantially circularly polarized light.

In the semitransmission-type liquid crystal display device having the above construction, in light from the backlight, the light part reflected from the reflection layer undergoes a change in the polarization axis by the quarter-wave plate disposed on the lower side (backlight side) of the reflection layer and is disadvantageously absorbed in the polarizing plate provided on the lower side (backlight side) of the quarter-wave plate. Consequently, light cannot be recycled, and satisfactory luminance cannot be provided. The light from the backlight and transmitted through openings in the reflection layer and through the quarter-wave plate is circularly polarized light. The half of the transmitted light is disadvantageously absorbed in the polarizing plate provided on the upper substrate. This poses a problem that satisfactory lightness and contrast cannot be provided.

To overcome the above problems, there have been proposed a semitransmission-type liquid crystal display device in which the cell gap between the transmission part and the reflection part has been regulated and the quarter-wave plate has been provided only on the reflection layer part. In this liquid crystal display device, a pair of retardation layers of the backlight side and the display side can be omitted, and, thus, the display device can realize a high level of luminance and a reduction in thickness of the display device.

Regarding the above semitransmission-type liquid crystal display device, for example, Japanese Patent Laid-Open No. 4494/2004 discloses a semitransmission-type liquid crystal display device comprising a reflection layer which has been patterned in any desired form. A retardation layer (quarter-wave plate) is provided only in the reflection display region. In this liquid crystal display device, light from the backlight and reflected from the reflection layer is not absorbed in the retardation layer, and, thus, light can be recycled. In this technique, good lightness and contrast are realized by regulating the cell gap in the transmission display region and the reflection display region so that, in the non-voltage-applied state, the phase shift of the liquid crystal layer in the transmission display region is half wavelength and the phase shift of the liquid crystal layer in the reflection display region is quarter wavelength.

Doornkamp et al. proposes a semitransmission-type liquid crystal display device having excellent lightness and contrast by regulating the cell gap in the transmission display region and the reflection display region so that, in the non-voltage-applied state, the phase shift of the liquid crystal layer in the transmission display region is half wavelength, and the phase shift of the liquid crystal layer in the reflection display region is quarter-wavelength, and providing a retardation plate (quarter-wave plate) only in the color filter part in the reflection display region (C. Doornkamp et al., SDI 2004 Digest, 670 (2004)).

Thus, in order to provide a retardation layer only in the reflection display region, the retardation layer should also be patterned in a form corresponding to reflection layer patterned in any desired form.

In the method described in Japanese Patent Laid-Open No. 4494/2004, however, photolithography is used for patterning of the retardation layer, and, thus, the production process is complicated. This has made it difficult to produce a liquid crystal display device in a cost-effective manner. That is, the photolithographic process comprises providing a photosensitive resin layer on the retardation layer, patterning the photosensitive resin layer in any desired form, etching the retardation layer using the photosensitive resin layer as a mask, and allowing the retardation layer to locally remain unremoved to form a retardation layer which has been patterned in any desired form. Accordingly, a plurality of steps has been necessary for patterning of the retardation layer.

Further, according to the proposal of Doornkamp et al., a part of the resin is cured by light irradiation through a photomask for patterning of the retardation layer, and the resin in the uncured part is cured by light irradiation. Therefore, the exposure should be carried out twice, and the development of a simpler method has been desired.

SUMMARY OF THE INVENTION

The present inventors have now found that a retardation layer can be patterned in a simple and low-cost manner by providing a polymerizable liquid crystal as a retardation layer forming material, applying light to cure a part of the polymerizable liquid crystal, and then conducting heat treatment to cure the uncured part. The present invention has been made based on such finding.

Accordingly, an object of the present invention is to provide a process for producing an optical element capable of imparting a patterned quarter-wave retardation for use in a semitransmission reflection liquid crystal display device in a simple and cost-effective manner. Another object of the present invention is to provide an optical element produced by the above method.

According to the present invention, there is provided a process for producing an optical element comprising a liquid crystal layer part, which causes a phase difference upon incidence of light, and an isotropic layer part, which does not cause a phase difference upon incidence of light, said liquid crystal layer part and said isotropic layer part having been patterned in a desired form. The process comprises the steps of:

coating a coating liquid comprising a polymerizable liquid crystal onto a base material to form a coating film;

aligning the polymerizable liquid crystal to a liquid crystal phase state;

applying an ionizing radiation to the coating film through a photomask to polymerize the polymerizable liquid crystal in the liquid crystal phase state, whereby the polymerizable liquid crystal only in its exposed part is cured to form said liquid crystal layer; and heating the resultant substrate with the coating film formed thereon to bring the polymerizable liquid crystal in the uncured state to an isotropic phase state and, in this state, to polymerize the uncured polymerizable liquid crystal to form an isotropic layer.

The present invention can produce an optical element capable of imparting a patterned quarter-wave retardation for use in a semitransmission reflection liquid crystal display device in a simple and cost-effective manner.

DETAILED DESCRIPTION OF THE INVENTION

Production Process of Optical Element

The process for producing an optical element according to the present invention comprises the steps of: coating a coating liquid comprising a polymerizable liquid crystal onto a base material to form a coating film; aligning the polymerizable liquid crystal to a liquid crystal phase state; applying an ionizing radiation to the coating film through a photomask to polymerize the polymerizable liquid crystal in the liquid crystal phase state, whereby the polymerizable liquid crystal only in its exposed part is cured to form the liquid crystal layer; and heating the resultant substrate with the coating film formed thereon to bring the polymerizable liquid crystal in the uncured state to an isotropic phase state and, in this state, to polymerize the uncured polymerizable liquid crystal to form an isotropic layer. According to the present invention, an optical element, which comprises a liquid crystal layer part capable of causing a phase difference upon incidence of light, and an isotropic layer part, which does not cause a phase difference upon incidence of light, said liquid crystal layer part and said isotropic layer part having been patterned in a desired form, can be produced in a simple and cost-effective manner. Individual steps in the production process will be described.

(1) Step of Forming Liquid Crystal Layer

Figure 1:
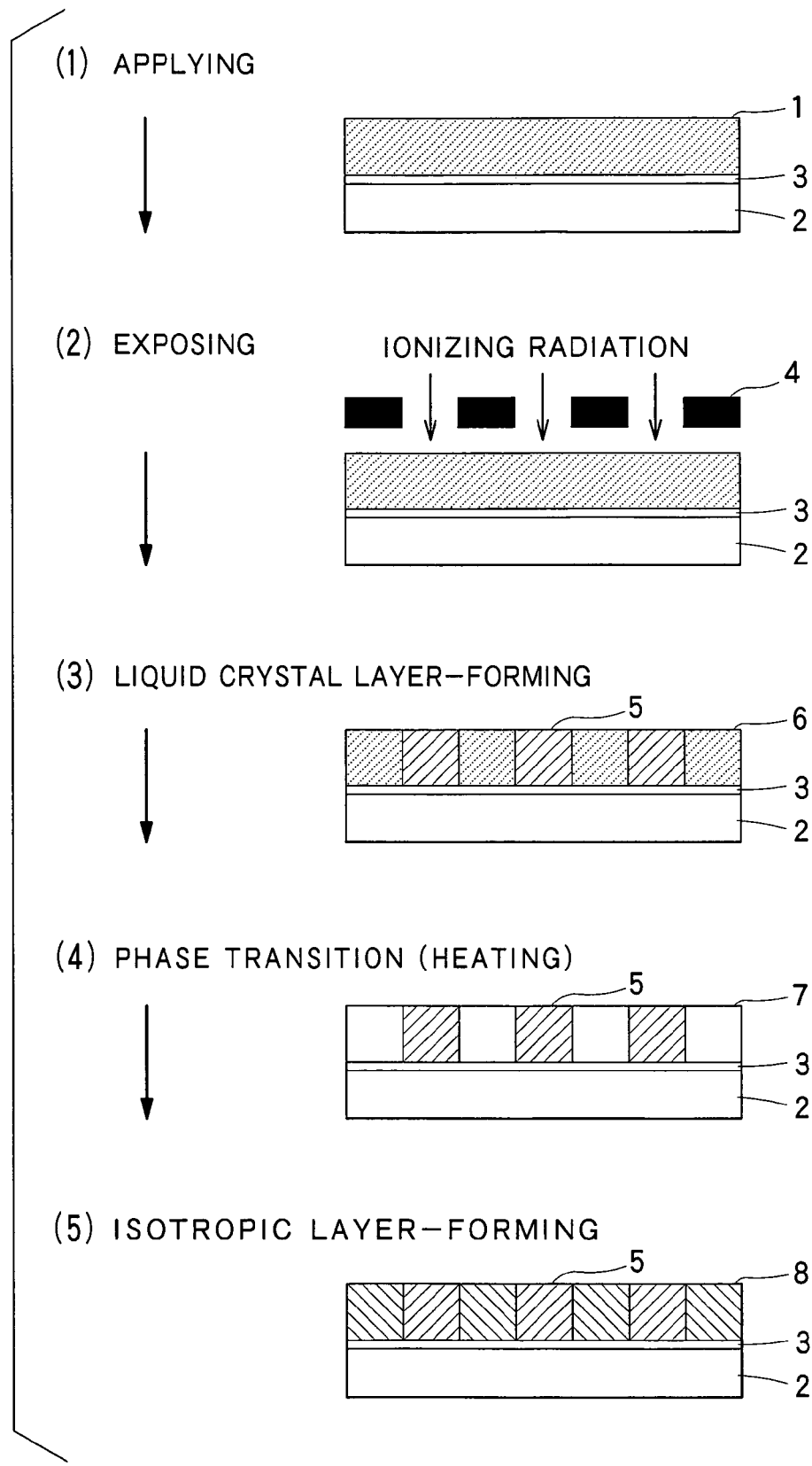
FIG. 1 is a schematic diagram showing an embodiment of the process for producing an optical element according to the present invention.

FIG. 1 shows one embodiment of the production process of an optical-element according to the present invention.

At the outset, as shown in step (1) in FIG. 1, a coating liquid containing a polymerizable liquid crystal is coated onto a base material 2 having an aligning ability to form a coating film 1. The coating liquid can be provided by conventional techniques. Specifically, the coating liquid can be coated onto a substrate, for example, by roll coating, gravure coating, slide coating, spin coating, or dipping. In order to enhance the adhesion between the base material and the coating film, as described in Japanese Patent Laid-Open No. 278491/1996, after the provision of an adhesive layer 3 on the base material 2, the coating liquid may be coated onto the adhesive layer.

Next, the coating film 1 formed on the base material is held at such a predetermined temperature that the polymerizable liquid crystal develops a liquid crystal structure (a liquid crystal structure-developed state being hereinafter referred to as "liquid crystal phase"). In this state, an ionizing radiation is applied through a photomask 4 to the coating film to polymerize the polymerizable liquid crystal for curing (a liquid crystal phase-cured state being hereinafter referred to as "liquid crystal layer" 5). According to the above steps, a liquid crystal layer 5 is formed at desired positions of the optical element (see steps (2) and (3) in FIG. 1). Parts other than the liquid crystal layer, that is, parts 6 not exposed to the ionizing radiation due to the presence of the photomask, is in such a state that the liquid crystal material is not solidified (liquid crystal phase).

When a three-dimensional crosslinking method is used as a method for curing the liquid crystal phase, for example, a method is adopted in which a photopolymerization initiator is added to liquid crystal molecules followed by ultraviolet light irradiation for curing. A method may also be adopted in which electron beams are directly applied for curing.

When ultraviolet light is used as the ionizing radiation, in general, the exposure dose is preferably about 200 mJ/cm$^2$, and the exposure wavelength is preferably about 200 to 450 nm, although these values vary depending upon polymerizable liquid crystal materials used. In the case of exposure to electron beams, 50 to 500 Gy is preferred.

(2) Step of Forming Isotropic Layer

Next, as shown in step (4) in FIG. 1, ionizing radiation-unexposed parts, that is, polymerizable liquid crystal-uncured parts (liquid crystal phase) 6, are heated at or above such a temperature that causes transition to an isotropic phase (hereinafter referred to as an isotropic phase transition temperature). At or above the isotropic phase transition temperature, the uncured polymerizable liquid crystal 6 is transited to an isotropic phase 7, and, consequently, the liquid crystal alignment disappears. The isotropic phase transition temperature may be measured with a measuring device such as DSC. In the phase transition from the liquid crystal phase to the isotropic phase, in general, the isotropic phase transition temperature can also be confirmed by observation under a polarization microscope. On the other hand, in the liquid crystal layer part cured by ionizing radiation irradiation in the previous step, since the liquid crystal molecules are fixed by polymerization, even heating to a temperature at or above the isotropic phase transition temperature does not cause the disturbance of the liquid crystal ordered alignment.

Next, as shown in step (5) in FIG. 1, the coating film is heated to polymerize the uncured polymerizable liquid crystal in an isotropic phase state 7 for curing to form an isotropic layer 8.

Thus, an optical element comprising a liquid crystal layer part 5, which causes a phase difference upon incidence of light, and an isotropic layer part 8, which does not cause a phase difference even upon incidence of light, the liquid crystal layer part 5 and the isotropic layer part 8 having been patterned in any desired form, can be produced in a simple and cost-effective manner by curing the whole polymerizable liquid crystal coated onto the base material.

Next, materials used in the production process according to the present invention will be described.

Base Material

In the present invention, the base material should have an aligning ability so that the polymerizable liquid crystal coated onto the base material can develop a liquid crystal phase. Such base materials having an aligning ability include base materials, which as such have an aligning ability, and base materials having an aligning ability produced by forming an aligning film on a transparent substrate.

An example of the base material which as such has an aligning ability is the case where the base material is a stretched film. When the stretched film is used, the polymerizable liquid crystal can be aligned along the direction of stretching. Accordingly, what is required in the preparation of the base material is only to provide a stretched film, and, thus, the process is advantageously very simple. Such stretched films may be commercially available stretched films. Alternatively, if necessary, stretched films of various materials may be formed.

Specific examples of such films include films of polycarbonate polymers, polyester polymers such as polyallylate and polyethylene terephthalate, polyolefin polymers such as polyimide polymers, polysulfone polymers, polyethersulfone polymers, polystyrene polymers, polyethylene, and polypropylene, and thermoplastic polymers such as polyvinyl alcohol polymers, cellulose acetate polymers, polyvinyl chloride polymers, and polymethyl methacrylate polymers, and films of liquid crystal polymers.

In the present invention, among others, polyethylene terephthalate (PET) films are preferred, for example, from the viewpoints of a wide stretch ratio range and easy availability.

The base material having an aligning ability imparted by forming an aligning film on a transparent substrate is advantageous in that a relatively wide range of alignment direction can be selected by selecting alignment treatment. Various alignment directions and effective alignment can be realized by selecting an alignment treatment method for an alignment film coated onto a transparent substrate. In general, aligning films used in liquid crystal display devices and the like may be preferably used as the aligning film. In general, an aligning ability can be imparted to the base material film by stacking an aligning film on a base material film or by subjecting a base material film or an aligning film stacked on the base material film to rubbing or polarization treatment. For example, polyimides, polyamides, and polyvinyl alcohols are generally used as the aligning film. The rubbing treatment is generally carried out by a method which comprises winding a rubbing cloth, selected from materials such as rayon, cotton, polyamides, and polymethyl methacrylate, around a metal roll and either rotating the assembly in such a state that the assembly is in contact with the film, or transferring the base material film while keeping the roll in a stationary state to rub the film face. The base material having an aligning ability can also be provided by polarization irradiation using a photoaligning film.

The transparent base material is not particularly limited so far as it is formed of a transparent material. Examples of transparent base materials include nonflexible transparent rigid materials such as quartz glass, Pyrex (registered trademark) glass, and synthetic quartz plates, or flexible transparent materials such as transparent resin films and optical resin plates.

Commercially available aligning films may also be used. An aligning film of Sunever (manufactured by Nissan Chemical Industries Ltd.), QL and LX series (manufactured by HITACHI CHEMICAL DU PONT MICRO SYSTEM CO., LTD.), AL series (manufactured by JSR), or Rikson aligner (manufactured by Chisso Corp.) is coated onto a substrate, and the coating is subjected to alignment treatment in the same manner as described above.

Polymerizable Liquid Crystal

The polymerizable liquid crystal used in the present invention is not particularly limited so far as the polymerizable liquid crystal can form a liquid crystal phase with nematic regularity or smectic regularity. Nematic liquid crystal materials are preferred. Among nematic liquid crystals, nematic liquid crystals containing two or more polymerizable groups in the liquid crystal molecule are preferred. Specifically, polymerizable liquid crystals as disclosed in Published Japanese Translation of International Patent Publication No. 513019/1999 are usable.

Polymerizable liquid crystals include polymerizable monomer molecules, polymerizable oligomer molecules, and polymerizable polymer molecules. They may be used either solely or as a mixture of two or more.

Specific preferred examples thereof include compounds represented by general formula (1):

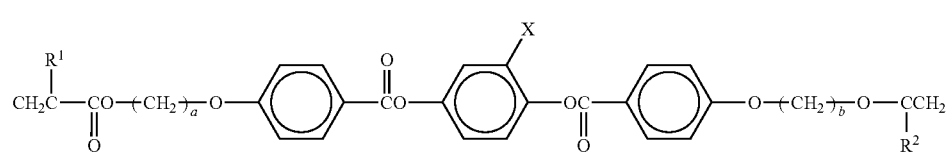

(1)

wherein $R^1$ and $R^2$ each represent hydrogen or a methyl group; X represents hydrogen, chlorine, bromine, iodine, an alkyl group having 1 to 4 carbon atoms, a methoxy group, a cyano group, or a nitro group; and a and b each are an integer of 2 to 12, and the following listed compounds:

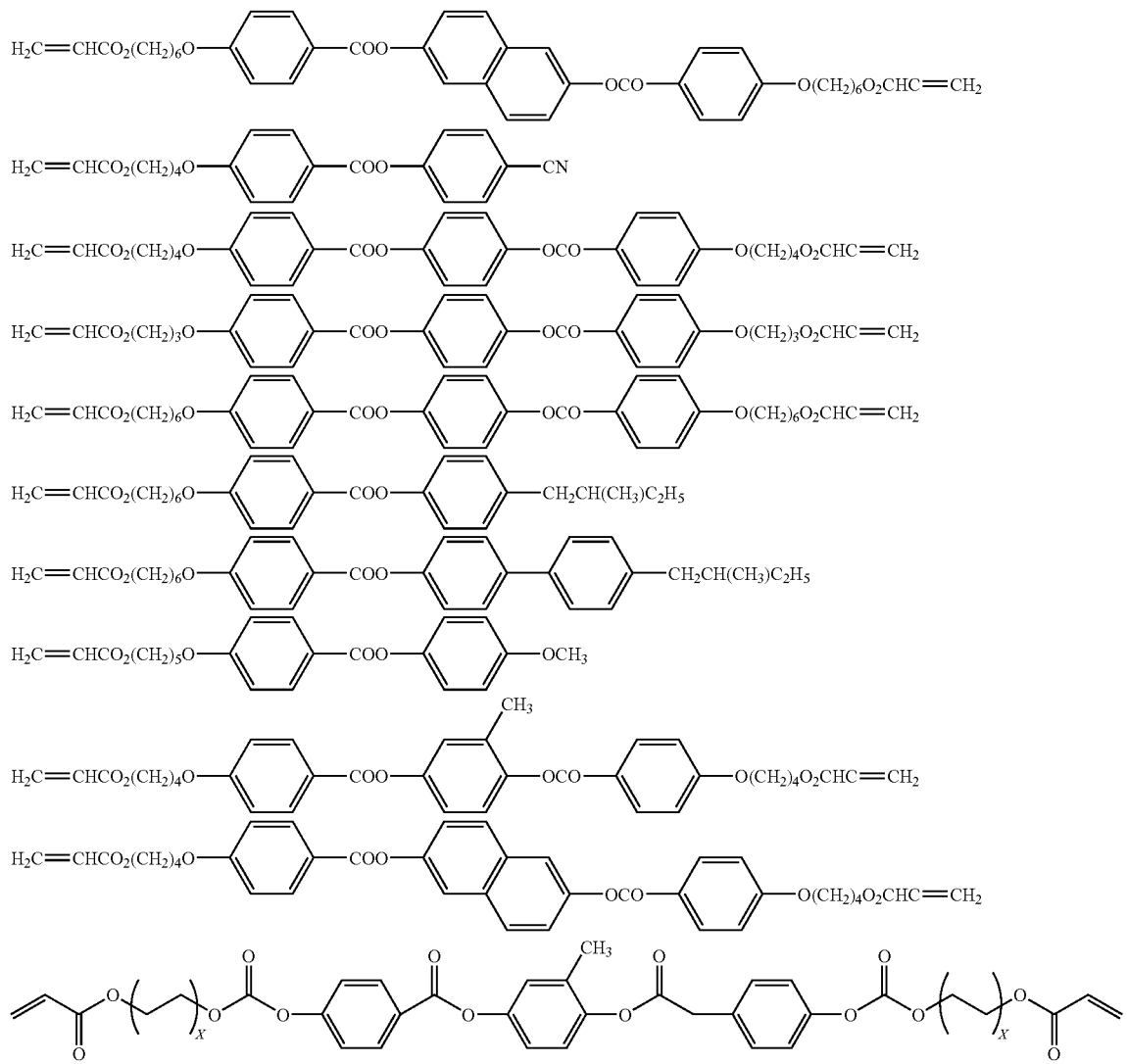

X = integer of 2 to 5

Further, compounds represented by general formula (1) and a mixture of two or more of the above compounds may also be used.

In the compounds represented by general formula (1), preferably, both $R^1$ and $R^2$ represent hydrogen from the viewpoint of the width of the temperature range in which the liquid crystal phase is exhibited. Preferably, X represents chlorine or a methyl group. Further, preferably, a and b respectively representing the chain length of the alkylene group as a spacer between the (meth)acryloyloxy group located at both ends of the molecular chain and the aromatic ring each are an integer in the range of 4 to 10, more preferably an integer of 6 to 9. When both a and b in general formula (1) are 0 (zero), the compound lacks in stability and is likely to undergo hydrolysis. Further, the crystallinity of the compound per se is also high. When each of a and b is 13 or more, the isotropic transition temperature (isotropic phase transition temperature) is low. For the above reason, in the compound wherein a and b are not in the range of 2 to 12, the temperature range in which the liquid crystallinity is exhibited is narrow and thus is unfavorable.

An example of a commercially available material is RMM 34 (manufactured by Merck).

Other Components

In the present invention, preferably, the polymerizable liquid crystal-containing coating liquid contains a photopolymerization initiator. A radical polymerizable initiator is preferred as the photopolymerization initiator. The radical polymerizable initiator generates free radicals upon exposure to energy such as ultraviolet light, and examples thereof include benzyl (also known as "bibenzoyl"), benzoin isobutyl ether, benzoin isopropyl ether, benzophenone, benzoyl benzoate, methyl benzoyl benzoate, 4-benozyl-4'-methyldiphenyl sulfide, benzyl methyl ketal, dimethylaminomethyl benzoate, 2-n-butoxyethyl-4-dimethylaminobenzoate, isoamyl p-dimethylaminobenzoate, 3,3'-dimethyl-4-methoxybenzophenone, methylobenzoyl formate, 2-methyl-1-(4-(methylthio)phenyl)-2-morpholinopropan-1-one, 2-benzyl-2-dimethylamino-1-(4-morpholinophenyl)-butan-1-one, 1-(4-dodecylphenyl)-2-hydroxy-2-methylpropan-1-one, 1-hydroxycyclohexyl phenyl ketone, 2-hydroxy-2-methyl-1phenylpropan-1-one, 1-(4-isopropylphenyl)-2-hydroxy-2-methylpropan-1-one, 2-chlorothioxanthone, 2,4-diethylthioxanthone, 2,4-diisopropylthioxanthone, 2,4-dimethylthioxanthone, isopropylthioxanthone, and 1-chloro-4-propoxythioxanthone. In the present invention, commercially available photopolymerization initiators are also usable. For example, ketone compounds such as Irgacure 184, Irgacure 369, Irgacure 651, and Irgacure 907 (all the above products being manufactured by Ciba Specialty Chemicals, K.K.), Dalocure (manufactured by Merck), and Adeka 1717 (manufactured by Asahi Denka Kogyo Ltd.) and biimidazole compounds such as 2,2'-bis(o-chlorophenyl)-4,5,4'-tetraphenyl-1,2'-biimidazole (manufactured by Kurogane Kasei Co., Ltd.) are preferred.

In addition to the photopolymerization initiator, sensitizing agents may also be added in such an amount that is not detrimental to the object of the present invention.

The photopolymerization initiator is preferably added in such an amount range that does not significantly sacrifice the liquid crystal regularity of the polymerizable liquid crystal. The amount of the photopolymerization initiator added to the polymerizable liquid crystal material is generally 0.01 to 15% by mass, preferably 0.1 to 12% by mass, more preferably 0.5 to 10% by mass.

In the present invention, the polymerizable liquid crystal-containing coating liquid preferably further comprises a thermal polymerization initiator. In the polymerizable liquid crystal, a polymerization reaction proceeds even upon heating. When a thermal polymerization initiator is incorporated, however, the polymerizable liquid crystal in an isotropic phase state can be efficiently polymerized for curing.

Radical polymerizable initiators are preferably usable as the thermal polymerization initiators, and examples thereof include azo compounds such as 2,2'-azobisisobutyinitrile, 2,2'-azobis-2-methylbutyronitrile, 2,2'-azobis(2,4-dimethylvaleronitrile), 2,2'-azobis(4-methoxy-2,4-dimethylvaleronitrile), 1,1'-azobis-1-cyclohexylnitrile, dimethyl-2,2'-azobisisobutyrate, 4,4'-azobis-4-cyanovaleric acid, 1,1'-azobis(1-acetoxy-1-phenylethane), and organic peroxides such as benzoyl peroxide, lauroyl peroxide, tert-butyl peroxide, and 1,1-bis(tert-butylperoxy)cyclohexane.

The thermal polymerization initiator is preferably added in such an amount range that does not significantly sacrifice the liquid crystal regularity of the polymerizable liquid crystal. The amount of the thermal polymerization initiator added to the polymerizable liquid crystal material is generally 0.01 to 15% by mass, preferably 0.1 to 12% by mass, more preferably 0.5 to 10% by mass.

The polymerizable liquid crystal-containing coating liquid used in the present invention preferably contains a surfactant. The incorporation of the surfactant can realize liquid crystal alignment at the interface of air.

The surfactant is not particularly limited so far as the liquid crystal development of the polymerizable liquid crystal material is not sacrificed, and examples thereof include nonionic surfactants such as polyoxyethylene alkyl ethers, polyoxyethylene alkyl allyl ethers, polyoxyethylene derivatives, polyoxyethylene-polyoxypropylene block polymers, polyoxyethylene sorbitan fatty acid esters, polyoxyethylene sorbitol fatty acid esters, polyoxyethylene fatty acid esters, and polyoxyethylne alkylamines, and anionic surfactants such as fatty acid salts, alkylsulfuric acid ester salts, alkylbenzenesulfonic acid salts, alkylnaphthalenesulfonic acid salts, alkylsulfosuccinic acid salts, alkyl diphenyl ether disulfonic acid salts, alkylphosphoric acid salts, polyoxyethylenealkylsulfuric acid ester salts, naphthalenesulfonic acid formalin condensates, special polycarboxylic acid-type polymer surfactants, and polyoxyethylene alkylphosphoric acid esters.

The amount of the surfactant added to the polymerizable liquid crystal material is generally in the range of 0.01 to 1% by mass, preferably in the range of 0.05 to 0.5% by mass.

The polymerizable liquid crystal and the above individual components may be dissolved in a solvent to prepare a coating liquid. The solvent is not particularly limited so far as the solvent can dissolve the polymerizable liquid crystal and the individual components. Preferred are organic solvents. When a coating film is evenly formed onto a base material by spin coating, for example, 3-methoxybutyl acetate, diethylene glycol dimethyl ether, propylene glycol monomethyl ether acetate, and cyclohexanone are preferably usable as the solvent.

The liquid crystal layer cured by ionizing radiation irradiation should cause a phase difference upon light incidence. The phase difference is determined by retardation level, that is, the product of the birefringent index ($\Delta n$) of the liquid crystal layer multiplied by the film thickness. Accordingly, the liquid crystal layer should be formed so as to have refractive index anisotropy. The refractive index anisotropy varies depending upon the liquid crystal material used and the aligning ability of the surface of the base material. In general, however, in a face parallel to the alignment direction, the refractive index difference $\Delta n$ determined by the following equation $$\Delta n = |n_X - n_Y|$$

is preferably about 0.03 to 0.20, more preferably about 0.05 to 0.15. In this equation, $n_X$ represents the refractive index in the direction of X axis at the right angle to the alignment direction; $n_Y$ represents the refractive index in the direction of Y axis parallel to the alignment direction; and $\Delta n$ represents the difference between the refractive index $n_X$ in the direction of X axis and the refractive index $n_Y$ in the direction of Y axis. When $\Delta n$ is not more than 0.03, the film thickness should be increased from the viewpoint of providing a desired retardation level, resulting in deteriorated liquid crystal layer alignment. On the other hand, when $\Delta n$ exceeds 0.20, the thickness of the liquid crystal layer is so small that the regulation of the film thickness is difficult. The birefringent index can be calculated by measuring the retardation value and the film thickness of the optical element.

The retardation value may be measured with a commercially available measuring device such as KOBRA-21 (manufactured by Oji Scientific Instruments Inc.). The measuring wavelength is preferably in a visible region (380 to 780 nm) and particularly preferably at a wavelength around 550 nm that provides the maximum relative luminosity.

The film thickness of the optical element may be measured with a tracer type level difference measuring meter or the like, and commercially available measuring device such as DEK-TAK (manufactured by Sloan) may be preferably used.

Semitransmission-Type Liquid Crystal Display Device

Figure 2:
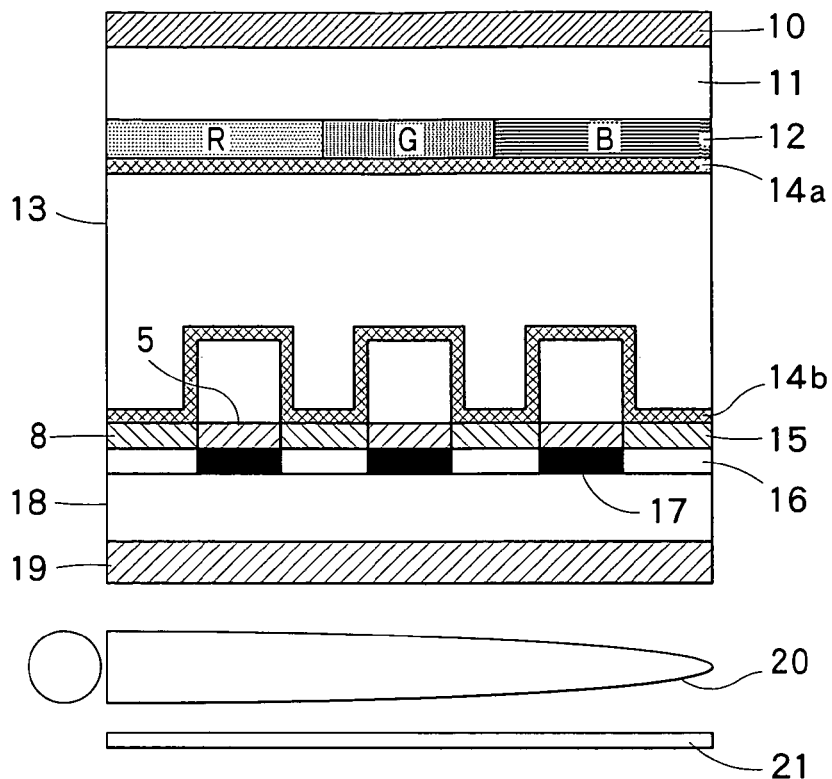
FIG. 2 is a schematic cross-sectional view showing an embodiment of the semitransmission-type liquid crystal display device comprising an optical element according to the present invention.

An embodiment, in which the optical element produced by the process according to the present invention is incorporated in an in-cell-type semitransmission liquid crystal display device, is shown in FIG. 2. As shown in FIG. 2, the liquid crystal display device comprises a liquid crystal cell 13 and a backlight 20. The liquid crystal cell 13 is held between a first substrate 11 and a second substrate 18. For example, TN (twisted nematic) liquid crystal is sealed in the liquid crystal cell 13.

A semitransmission reflection layer 17 formed of a high reflective metal film of aluminum, silver, an alloy of these metals or the like is provided on the second substrate formed of a transparent material. An opening 16 through which light emitted from the backlight is passed, is provided on each pixel basis in the semitransmission reflection layer 17. The layer comprises a reflection display region (part 17 in which the metal film is present) and a transmission display region (part 16 in opening).

The optical element 15 according to the present invention is provided on the semitransmission reflection layer. The optical element 15 is disposed so that the liquid crystal layer part 5 constituting the optical element 15 corresponds to the reflection display region 17 and the isotropic layer part 8 corresponds to the transmission display region 16. In order to protect the optical element, for example, a protective layer (not shown) formed of an insulating film such as an acrylic photosensitive resin film may be provided.

A pixel electrode 14b formed of a transparent electrically conductive film such as an ITO film is provided on the optical element 15. An aligning film (not shown) formed of a polyimide or the like is stacked so as to cover the pixel electrode 14b.

The second substrate 18 comprises an element substrate with a pixel switching element such as TFT, a data line, a scan line or the like formed thereon (not shown). A second polarizing plate 19 is provided on the backlight side of the second substrate.

A color filter 12 comprising individual coloring matter layers of R (red), G (green), and B (blue) is provided on the lower side (backlight side) of the first substrate 11, and a common electrode 14a formed of a transparent electrically conductive film and an aligning film (not shown) are stacked in that order under the color filter 12. A first polarizing plate 10 is provided on the upper side (display side) of the first substrate 11.

The refractive index anisotropy of the liquid crystal, $\Delta n$, and the liquid crystal layer thickness d are designed so as to meet the following requirements. In the case of TN liquid crystal present within the liquid crystal cell, in a voltage applied state, liquid crystal molecules stand along the electric field direction, and, in this case, the phase shift in the liquid crystal cell becomes 0 (zero) in both the reflection display region and the transmission display region. On the other hand, in a non-voltage-applied state, the liquid crystal molecules lie, and the phase shift in the liquid crystal cell is quarter wavelength in the reflection display region and is half wavelength in the transmission display region. The alignment axis in the aligning film under the first substrate is perpendicular or parallel to the transmission axis of the first polarizing plate, and, in a non-voltage-applied state, the liquid crystal molecules within the liquid crystal cell are twisted by 90 degrees between the first substrate and the second substrate.

The backlight 20 comprises a light source, a reflecting plate, and a light conductive plate. A reflector plate 21 for allowing light transmitted through the light conductive plate to exit toward the liquid crystal cell side is provided on the lower face side of the light conductive plate.

Next, the principle of display of the semitransmission-type liquid crystal display device will be described.

At the outset, light (external light) incident from the display side is passed through the first polarizing plate 10 and is converted to linearly polarized light and, in this state, is transmitted through the interior of the liquid crystal cell 13. When the light is transmitted through the liquid crystal layer part 5 in the optical element 15, a quarter-wave retardation is imparted and, consequently, the light is converted to circularly polarized light. Next, when this circularly polarized light is reflected from the surface of the semitransmission reflection layer 17, the polarization direction is reversed. When the circularly polarized light with the reversed polarization direction is again transmitted through the liquid crystal layer part 5, the light is converted to linearly polarized light which, in this state, is transmitted through the liquid crystal cell 13. This linearly polarized light has a polarization axis perpendicular to the first polarizing plate 10 and thus is absorbed in the first polarizing plate and consequently does not exit toward the viewer's side, resulting in dark display.

On the other hand, light which has exited from the backlight 20 is transmitted through the second polarizing plate 19 and is converted to linearly polarized light and, in this state, is transmitted through the liquid crystal cell 13. As with the above case, this linearly polarized light is absorbed in the first polarizing plate 10, herein again, resulting in dark display.

In the non-voltage-applied state, when light is transmitted through the liquid crystal cell 13, a half-wave retardation is imparted by the optical rotatory power possessed by the TN liquid crystal. Accordingly, in both the external light (reflection display) and the backlight (transmission display), the linearly polarized light transmitted through the first polarizing plate 10 has a polarization axis parallel to the polarizing plate, and, thus, the outgoing light is not absorbed by the first polarizing plate 10, resulting in bright display.

Light, from the backlight, transmitted through the second polarizing plate 19 is converted to linearly polarized state. The linearly polarized light is reflected from the backside of the semitransmission reflection layer 17 and, in this state, is transmitted through the second polarizing plate 19 and can be returned to the backlight side. Accordingly, light can be reutilized, and a high-luminance display device can be realized.

Thus, the use of the optical element according to the present invention in the semitransmission-type liquid crystal display device can realize the production of a high-luminance and high-contrast liquid crystal display device in a simple and cost-effective manner.

Figure 3:
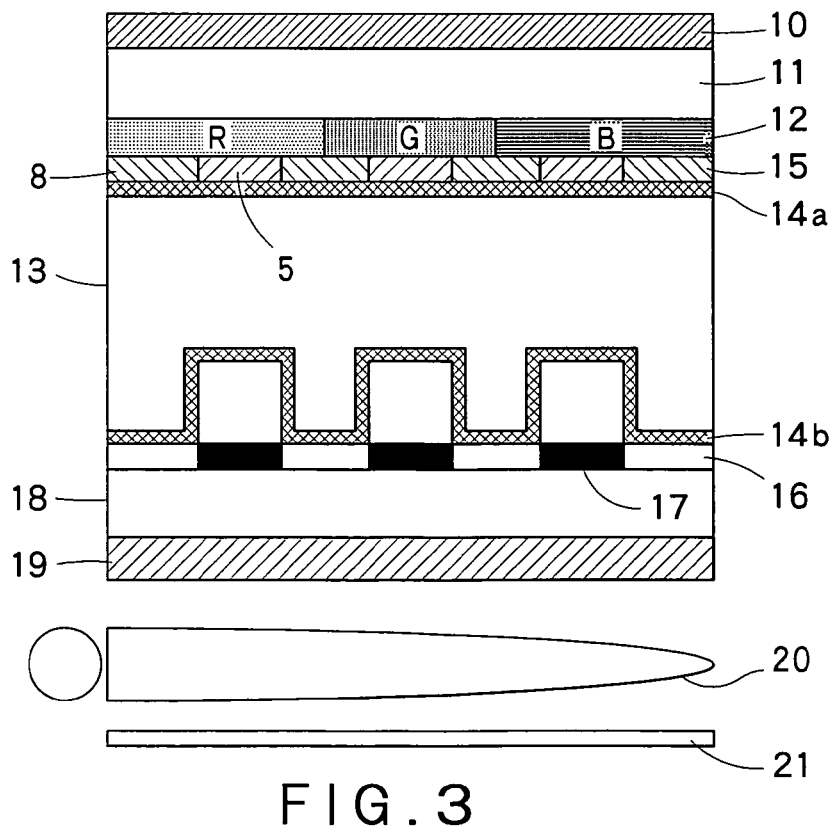
FIG. 3 is a schematic cross-sectional view showing another embodiment of the semitransmission-type liquid crystal display device comprising an optical element according to the present invention.

In the semitransmission-type liquid crystal display device in another embodiment of the present invention, as shown in FIG. 3, a retardation layer may be provided on the first substrate side. As shown in FIG. 3, the liquid crystal display device comprises a liquid crystal cell 13 and a backlight 20, and the liquid crystal cell 13 is held between a first substrate 11 and a second substrate 18. For example, TN (twisted nematic) liquid crystal is sealed in the liquid crystal cell 13.

A semitransmission reflection layer 17 formed of a high reflective metal film of aluminum, silver, an alloy of these metals or the like is provided on the second substrate formed of a transparent material. An opening 16 through which light emitted from the backlight is passed, is provided on each pixel basis in the semitransmission reflection layer 17. The layer comprises a reflection display region (part 17 in which the metal film is present) and a transmission display region (part 16 in opening).

A color filter comprising individual coloring matter layers of R (red), G (green), and B (blue) is provided on the lower side (backlight side) of the first substrate. The optical element 15 according to the present invention is provided on the lower side (backlight side) of the color filter. The optical element 15 is disposed so that the liquid crystal layer part 5 constituting the optical element 15 functions as the pixel part on the color filter corresponding to the reflection display region 17 and the isotropic layer part 8 functions as the pixel part on the color filter corresponding to the transmission display region 16. In order to protect the optical element, for example, a protective layer (not shown) formed of an insulating film such as an acrylic photosensitive resin film may be provided.

A pixel electrode 14a formed of a transparent electrically conductive film such as an ITO film is provided on the optical element 15. An aligning film (not shown) formed of a polyimide or the like is stacked so as to cover the pixel electrode 14a. Further, a first polarizing plate 10 is provided on the upper side (display side) of the first substrate 11.

The second substrate 18 comprises an element substrate with a pixel switching element such as TFT, a data line, a scan line or the like formed thereon (not shown). A second polarizing plate 19 is provided on the backlight side of the second substrate.

The principle of display of the semitransmission-type liquid crystal display device will be described.

At the outset, light (external light) incident from the display side is transmitted through the first polarizing plate 10 and is converted to linearly polarized light and, in this state, is transmitted through the liquid crystal layer part 5 in the optical element 15 and is converted to quarter-wave circularly polarized state. In this state, the light is transmitted through the liquid crystal cell 13, and, upon reflection from the surface of the semitransmission reflection layer 17, the polarizing direction is reversed. In this state, the light is transmitted through the liquid crystal cell 13, is transmitted through the liquid crystal part 5 in the optical element 15, and is converted to linearly polarized light. This linearly polarize d light has a polarization axis perpendicular to the first polarizing plate 10 and thus is absorbed in the first polarizing plate and consequently does not exit toward the viewer's side, resulting in dark display.

On the other hand, light which has exited from the backlight 20 is transmitted through the second polarizing plate 19 and is converted to linearly polarized light and, in this state, is transmitted through the liquid crystal cell 13. As with the above case, this linearly polarized light is absorbed in the first polarizing plate 10, herein again, resulting in dark display.

In the non-voltage-applied state, when light is transmitted through the liquid crystal cell 13, a half-wave retardation is imparted by the optical rotatory power possessed by the TN liquid crystal. Accordingly, in both the external light (reflection display) and the backlight light (transmission display), the linearly polarized light transmitted through the first polarizing plate 10 has a polarization axis parallel to the polarizing plate, and, thus, the outgoing light is not absorbed by the first polarizing plate 10, resulting in bright display.

Light, from the backlight, transmitted through the second polarizing plate 19 is converted to linearly polarized state. The linearly polarized light is reflected from the backside of the semitransmission reflection layer 17 and, in this state, is transmitted through the second polarizing plate 19 and can be returned to the backlight side. Accordingly, light can be reutilized, and a high-luminance display device can be realized.

EXAMPLES

The following Examples further illustrate the present invention. However, it should be noted that the present invention is not limited these Examples only.

Example 1

(1) Preparation of Optical Element

A glass substrate with an aligning film provided thereon was provided as a base material. An aligning film (AL1254) manufactured by JSR, Inc. was spin coated onto a glass base material having a size of 100 mm×100 mm to a coating thickness of 0.065 μm, and the coating was baked at 230° C. in an oven for one hr. The aligning film provided on the base material was then subjected to alignment treatment with a rubbing device.

Next, a coating liquid having the following composition was spin coated onto the base material to a coating thickness of about 0.8 μm (on a baked state basis).

| <Composition for coating liquid> | |
|---|---|
| Polymerizable liquid crystal (RMM 34: manufactured by Merck & Co. Inc.) | 23.75 pts. wt. |
| Photopolymerization initiator (Irg 184: manufactured by Ciba Specialty Chemicals, K.K.) | 1.25 pts. wt. |
| Solvent (diethylene glycol dimethyl ether) | 75 pts. wt. |

Next, the substrate thus formed was held at 80° C. for 3 min to bring the polymerizable liquid crystal to a liquid crystal phase. When the coating film was changed from an opaque state to a transparent state, it was judged that the phase was transited to a liquid crystal phase. In this state, ultraviolet light was applied onto the coating film through a photomask in any desired form with an ultraviolet irradiation device to three-dimensionally crosslink the polymerizable liquid crystal for curing. The exposure was 20 mW/cm$^2$×5 sec. Thus, a patterned liquid crystal layer was formed on the base material.

Subsequently, the base material was held and baked in an oven of 230° C. for 30 min to polymerize, in an isotropic state, the uncured polymerizable liquid crystal for curing. Thus, an optical element 1 comprising a liquid crystal layer part and an isotropic layer part that had been patterned in any desired form was prepared.

(2) Evaluation

The phase difference (retardation) of the liquid crystal layer part in the optical element 1 thus obtained was measured with KOBRA-21 (manufactured by Oji Scientific Instruments) at 550 nm. The retardation of the liquid crystal layer on the substrate in a normal direction was about 100 nm.

Further, when the optical element 1 was disposed in a crossed Nicol state so that the angle of the optical element 1 to the polarizing axis was 45 degrees. As a result, the transmission of light in a pattern form could be confirmed.

Example 2

(1) Preparation of Optical Element

The same base material as used in Example 1 was used. A coating liquid having the following composition was spin coated onto the base material to a coating thickness of about 0.8 μm (on a baked state basis).

| <Composition for coating liquid> | |
|---|---|
| Polymerizable liquid crystal (RMM 34: manufactured by Merck & Co. Inc.) | 22.5 pts. wt. |
| Photopolymerization initiator (Irg 184: manufactured by Ciba Specialty Chemicals, K.K.) | 1.25 pts. wt. |

| <Composition for coating liquid> | |
| --- | --- |
| Thermal polymerization initiator (AIBN: manufactured by Wako Pure Chemical Industries, Ltd.) | 1.25 pts. wt. |
| Solvent (diethylene glycol dimethyl ether) | 75 pts. wt. |

Next, the substrate thus formed was held at 80° C. for 3 min to bring the polymerizable liquid crystal to a liquid crystal phase. When the coating film was changed from an opaque state to a transparent state, it was judged that the phase was transited to a liquid crystal phase. In this state, ultraviolet light was applied onto the coating film through a photomask in any desired form with an ultraviolet irradiation device to three-dimensionally crosslink the polymerizable liquid crystal for curing. The exposure was 20 mW/cm$^2$×5 sec. Thus, a patterned liquid crystal layer was formed on the base material.

Subsequently, the base material was held and baked in an oven of 130° C. for 5 min to polymerize, in an isotropic state, the uncured polymerizable liquid crystal for curing. Thus, an optical element 2 comprising a liquid crystal layer part and an isotropic layer part that had been patterned in any desired form was prepared.

(2) Evaluation

The phase difference (retardation) of the liquid crystal layer part in the optical element 2 thus obtained was measured in the same manner as in Example 1. As a result, the retardation of the liquid crystal layer on the substrate in a normal direction was about 100 nm.

Further, when the optical element 2 was disposed in a crossed Nicol state so that the angle of the optical element 2 to the polarizing axis was 45 degrees. As a result, the transmission of light in a pattern form could be confirmed.

What is claimed is:

1. A process for producing an optical element comprising a liquid crystal layer part, which causes a phase difference upon incidence of light, and an isotropic layer part, which does not cause a phase difference upon incidence of light, said liquid crystal layer part and said isotropic layer part having been patterned in a desired form, said process comprising the steps of:

coating a coating liquid comprising a polymerizable liquid crystal onto a base material to form a coating film;

aligning said polymerizable liquid crystal to a liquid crystal phase state;

applying an ionizing radiation to said coating film through a photomask to polymerize said polymerizable liquid crystal in the liquid crystal phase state, whereby said polymerizable liquid crystal only in its exposed part is cured to form said liquid crystal layer; and heating the resultant substrate with the coating film formed thereon to bring the polymerizable liquid crystal in the uncured state to an isotropic phase state and, in this state, to polymerize the uncured polymerizable liquid crystal to form an isotropic layer.

2. The process according to claim 1, wherein said liquid crystal phase part can convert linearly polarized light to circularly polarized light.

3. The process according to claim 1, wherein said coating liquid comprises a photopolymerization initiator.

4. The process according to claim 3, wherein said coating liquid further comprises a thermalpolymerization initiator.

5. The process according to claim 1, wherein said polymerizable liquid crystal is a nematic liquid crystal.

6. The process according to claim 1, wherein an aligning film is provided on a surface of said base material.

7. An optical element produced by a process according to claim 1.

8. A semitransmission-type liquid crystal display device comprising an optical element according to claim 7.

* * * * *